United States Patent
DiDea et al.

(10) Patent No.: US 10,370,833 B2
(45) Date of Patent: Aug. 6, 2019

(54) FLUID DELIVERY SYSTEM AND METHOD

(71) Applicants: Frank L. DiDea, Mesa, AZ (US); Chris A. DiDea, Mesa, AZ (US)

(72) Inventors: Frank L. DiDea, Mesa, AZ (US); Chris A. DiDea, Mesa, AZ (US)

(73) Assignee: Knarf, LLC, Mesa, AZ (US)

( * ) Notice: Subject to any disclaimer, the term of this patent is extended or adjusted under 35 U.S.C. 154(b) by 0 days.

(21) Appl. No.: 15/079,258

(22) Filed: Mar. 24, 2016

(65) Prior Publication Data

US 2017/0275856 A1 Sep. 28, 2017

(51) Int. Cl.
*E03C 1/04* (2006.01)
*F16K 11/065* (2006.01)

(52) U.S. Cl.
CPC ............ *E03C 1/04* (2013.01); *F16K 11/0655* (2013.01); *E03C 1/041* (2013.01); *E03C 2201/30* (2013.01)

(58) Field of Classification Search
CPC .... E03C 1/0404; E03C 1/0401; E03C 1/0402; E03C 2201/30; E03C 1/0403; F16K 11/0445
See application file for complete search history.

(56) References Cited

U.S. PATENT DOCUMENTS

| | | |
|---|---|---|
| 958,735 A | 5/1910 | Ericson |
| 2,840,109 A | 6/1958 | Wadleigh |
| 3,129,894 A | 4/1964 | Schermerhorn |
| 3,199,121 A | 8/1965 | Greto |
| 3,419,914 A | 1/1969 | Moen |
| 3,559,690 A * | 2/1971 | Palmer ............... E03C 1/08 137/467 |
| 3,801,997 A | 4/1974 | Ward |
| 3,866,629 A | 2/1975 | Nicklas |
| 3,906,983 A | 9/1975 | Parkison |
| 4,116,210 A | 9/1978 | Nelson |
| 4,353,139 A | 10/1982 | Wainwright et al. |
| 4,554,948 A | 11/1985 | Bergmann |
| 282,563 A | 2/1986 | Beene |
| 4,709,429 A | 12/1987 | Lemer et al. |
| 4,821,960 A | 4/1989 | Goldman |
| 4,848,403 A | 7/1989 | Pilolla et al. |
| 5,125,577 A | 6/1992 | Frankel |
| 5,127,438 A | 7/1992 | Williams |
| 5,279,005 A | 1/1994 | Valley |
| 354,550 A | 1/1995 | Munoz |
| 5,482,078 A | 1/1996 | Yeh |
| 6,070,280 A | 6/2000 | Ko |
| 6,205,598 B1 | 3/2001 | Black et al. |
| D465,009 S | 10/2002 | Siefken |
| 6,775,866 B1 | 8/2004 | Martir et al. |
| D501,040 S | 1/2005 | Gieson et al. |
| 7,225,828 B2 | 6/2007 | Giagni, Jr. et al. |

(Continued)

*Primary Examiner* — Janie M Loeppke

(57) ABSTRACT

In accordance with an embodiment, a fluid delivery system is provided that includes a faucet body having opposing ends spaced apart by a channel and a universal adapter mated to one end of the faucet body and a spout mated to the other end of the faucet body. A diverter is connected to the spout. In accordance with another embodiment, a method for manufacturing a faucet includes providing a faucet having a diverter, wherein the diverter includes a cavity configured for reducing water pressure within the cavity and bonding a protective material to the faucet so that the faucet and the protective material form a unitary structure.

26 Claims, 12 Drawing Sheets

(56) References Cited

U.S. PATENT DOCUMENTS

| | | |
|---|---|---|
| 7,818,830 B2 | 10/2010 | Thorne et al. |
| 8,251,090 B2 | 8/2012 | Lin |
| 8,376,248 B2 | 2/2013 | Meisner et al. |
| 8,424,129 B2 | 4/2013 | Henderson et al. |
| 8,566,975 B1 | 10/2013 | Lin |
| 9,328,487 B2 | 5/2016 | Wernke |
| 2004/0140004 A1 | 7/2004 | Ouyoung |
| 2004/0261853 A1* | 12/2004 | Jennings ............ E03C 1/042 137/360 |
| 2006/0016001 A1 | 1/2006 | Zhao |
| 2006/0191572 A1 | 8/2006 | Breda |
| 2007/0119506 A1 | 5/2007 | Giagni, Jr. et al. |
| 2007/0277891 A1 | 12/2007 | Frankel |
| 2008/0110512 A1 | 5/2008 | Giagni et al. |
| 2008/0196159 A1 | 8/2008 | Lee |
| 2009/0014434 A1 | 1/2009 | Gloodt |
| 2009/0050835 A1 | 2/2009 | Boise et al. |
| 2009/0236000 A1 | 9/2009 | Miller et al. |
| 2010/0006164 A1 | 1/2010 | Moncayo et al. |
| 2011/0023979 A1 | 2/2011 | Henderson et al. |
| 2011/0284111 A1 | 11/2011 | Marty et al. |
| 2012/0055558 A1 | 3/2012 | Miller et al. |
| 2014/0103140 A1 | 4/2014 | Busby |
| 2014/0325752 A1 | 11/2014 | Tuineag |
| 2014/0374636 A1 | 12/2014 | Ye |
| 2016/0032569 A1* | 2/2016 | Yang ............ E03C 1/0403 137/360 |
| 2016/0053470 A1* | 2/2016 | Huang ............ E03C 1/0404 137/801 |

* cited by examiner

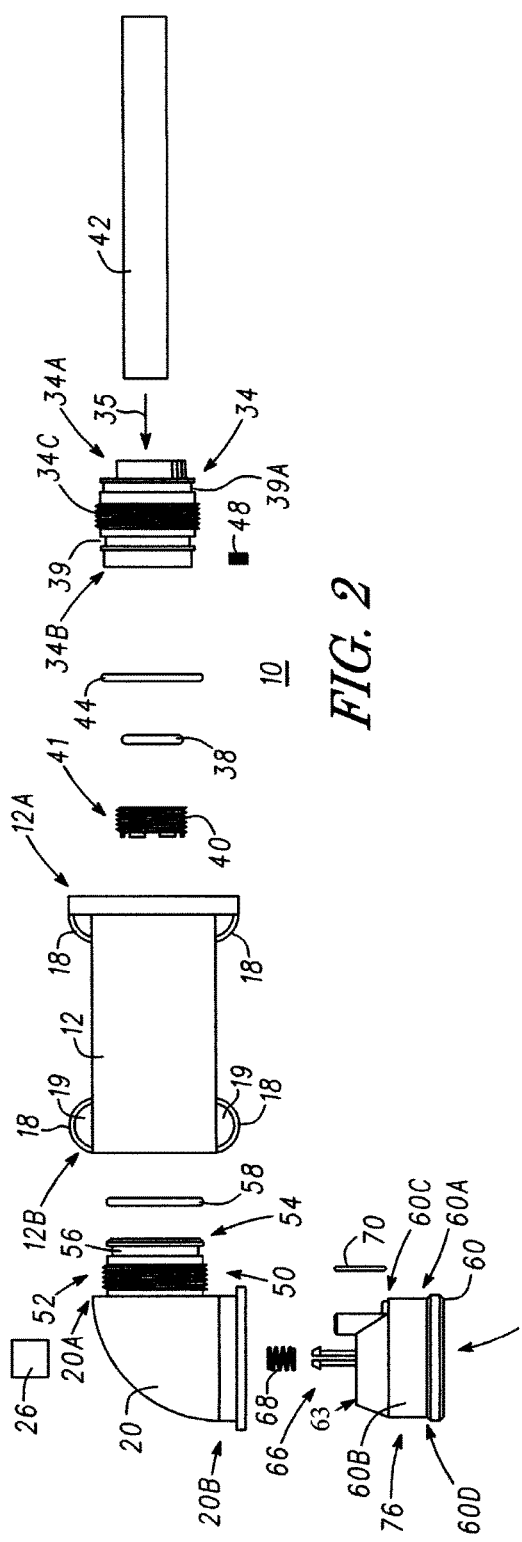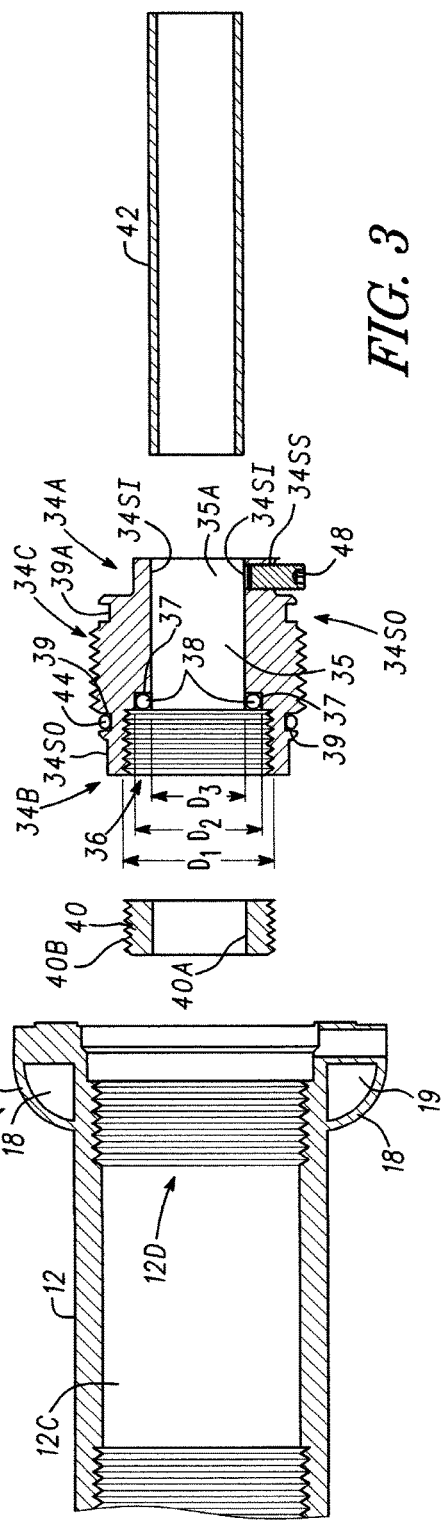

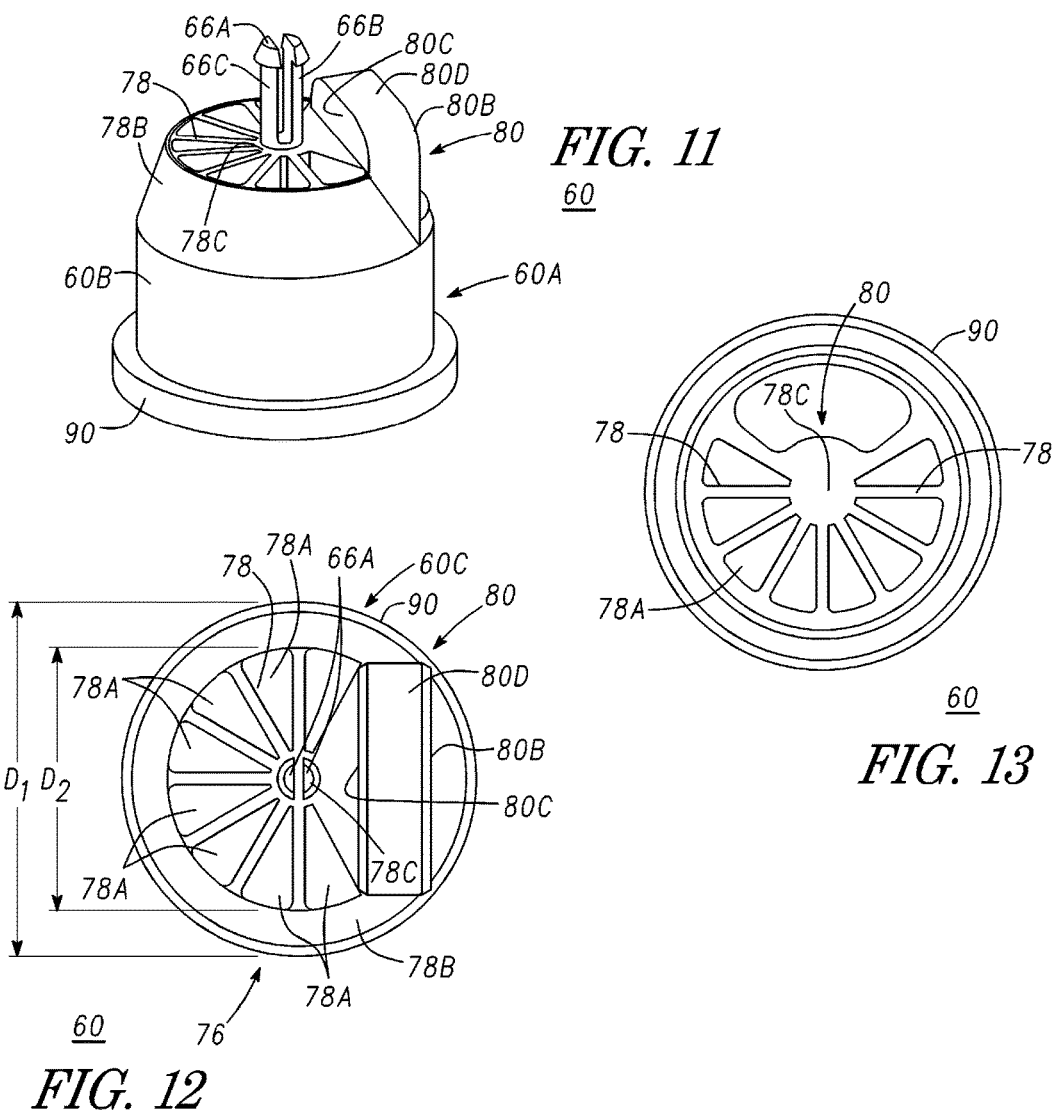
FIG. 11
FIG. 13
FIG. 12
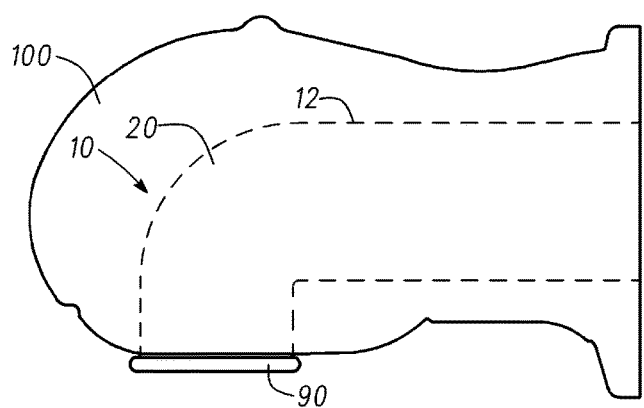
FIG. 16

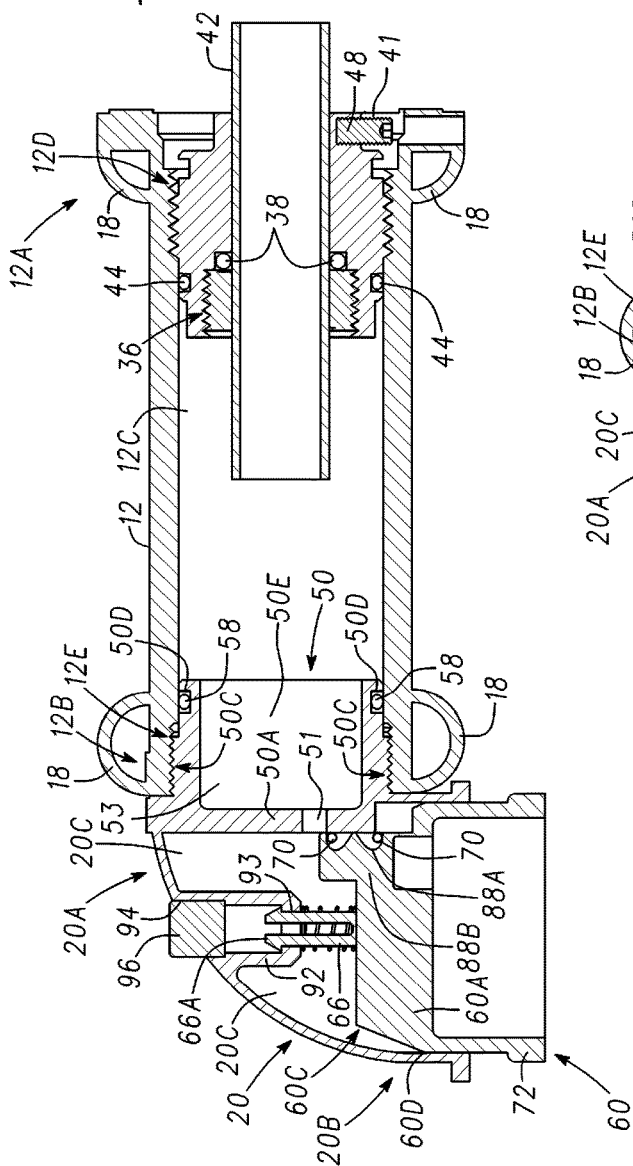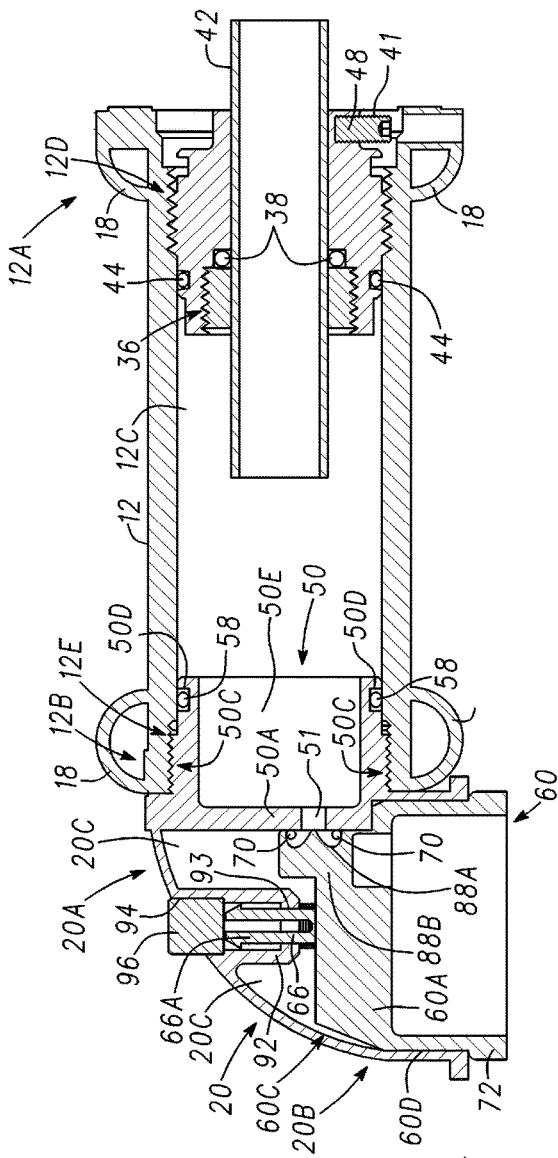

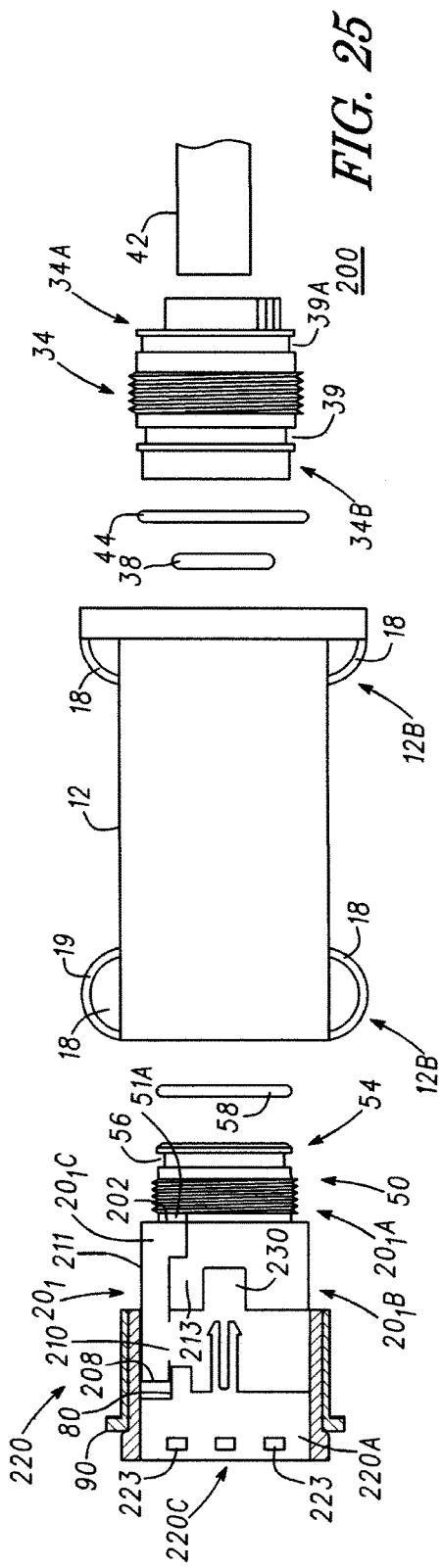
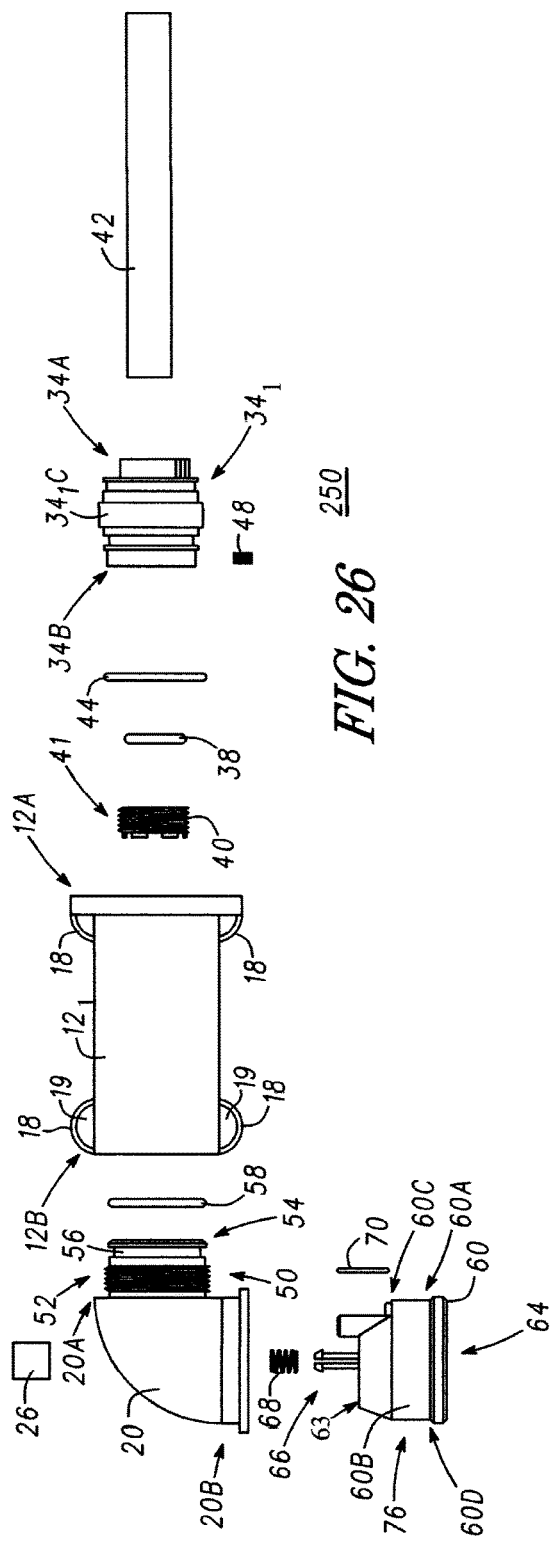

US 10,370,833 B2

FLUID DELIVERY SYSTEM AND METHOD

TECHNICAL FIELD

The present invention relates, in general, to plumbing fixtures and, more particularly, to fluid delivery systems.

BACKGROUND

In the past, plumbing fixture manufactures have configured faucets so that the faucet can route water in two directions. For example, kitchen sink faucets are capable of directing water flow towards an outlet of the faucet or towards a separate spraying structure. Similarly, bathtub faucets are capable of directing water towards the outlet of the faucet or towards a shower head. U.S. Patent Application Publication No. 2014/0374636 A1 by Wen-Hua Ye published on Dec. 25, 2014 and U.S. Patent Application Publication No. 2010/0006164 A1 by Luis Moncayo et al. published on Jan. 14, 2010 describe bathtub faucet switching structures. Drawbacks with these plumbing fixtures are that a bather can injure themselves with the faucet and the faucet can unexpectedly switch from the showering configuration to a bathing configuration.

Accordingly, it would be advantageous to have a plumbing fixture that includes a protective structure and a method for manufacturing the plumbing fixture. It would be of further advantage for the structure and method to be cost efficient to implement.

BRIEF DESCRIPTION OF THE DRAWINGS

The present invention will be better understood from a reading of the following detailed description, taken in conjunction with the accompanying drawing figures, in which like reference characters designate like elements and in which:

FIG. 2 is an exploded side view of the plumbing fixture of FIG. 1 in accordance with an embodiment of the present invention;

FIG. 3 is an exploded cross-sectional view of a portion of a plumbing fixture in accordance with an embodiment of the present invention;

FIG. 11 is a perspective view of the diverter of FIGS. 7-10 in accordance with an embodiment of the present invention;

FIG. 12 is a top view of the diverter of FIGS. 7-11 in accordance with an embodiment of the present invention;

FIG. 13 is a bottom view of the diverter of FIGS. 7-12 in accordance with an embodiment of the present invention;

FIG. 14 is an unexploded cross-sectional view of the plumbing fixture of FIG. 2 in a first configuration in accordance with another embodiment of the present invention;

FIG. 15 is an unexploded cross-sectional view of the plumbing fixture of FIG. 2 in a second configuration in accordance with another embodiment of the present invention;

FIG. 16 is a side view of a plumbing fixture in accordance with another embodiment of the present invention;

FIG. 25 is an exploded cross-sectional view of a portion of a plumbing fixture in accordance with an embodiment of the present invention;

FIG. 26 is an exploded cross-sectional view of a portion of a plumbing fixture in accordance with an embodiment of the present invention;

Figure 1:
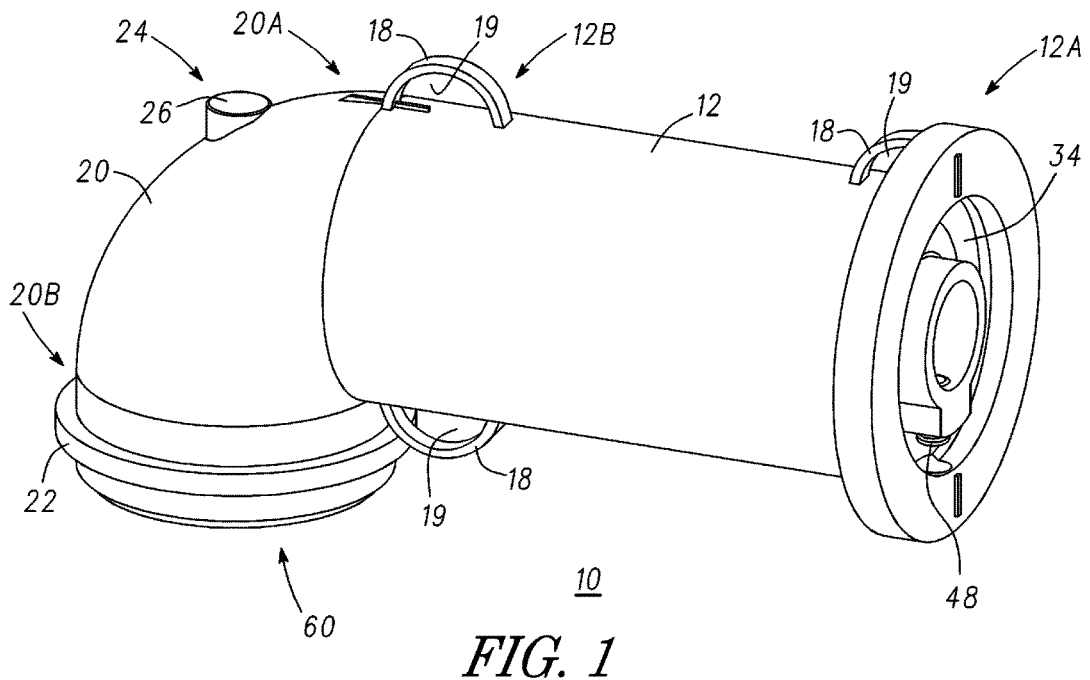
FIG. 1 is a perspective view of a plumbing fixture in accordance with an embodiment of the present invention.

For simplicity and clarity of illustration, elements in the figures are not necessarily to scale, and the same reference characters in different figures denote the same elements. Additionally, descriptions and details of well-known steps and elements are omitted for simplicity of the description. It will be appreciated by those skilled in the art that the words during, while, and when as used herein are not exact terms that mean an action takes place instantly upon an initiating action but that there may be some small but reasonable delay, such as a propagation delay, between the reaction that is initiated by the initial action and the initial action. The use of the words approximately, about, or substantially means that a value of an element has a parameter that is expected to be very close to a stated value or position. However, as is well known in the art there are always minor variances that prevent the values or positions from being exactly as stated.

DETAILED DESCRIPTION

Generally, the present invention provides a fluid delivery system and methods for manufacturing the fluid delivery system. In accordance with an embodiment of the present invention, the fluid delivery system comprises a faucet body having a first end, a second end, and a channel that extends from the first end of the faucet body to the second end of the faucet body, wherein the faucet body has an exterior surface and an interior surface, and the channel having a first threaded portion at the first end and a second threaded portion at the second end, a universal adapter comprising a threaded body having a first end, a second end, and a duct, the first end and the second end on opposite ends of the threaded body, wherein the threaded body has an exterior wall and an interior wall, the interior wall bounding the duct, and wherein the universal adapter is coupled to the faucet body, an elbow spout having a first end and a second end, the first end of the elbow coupled to the faucet body, and a diverter having a first end and a second end, the diverter coupled to the elbow spout.

In accordance with another aspect of the present invention, the fluid delivery system further includes a bushing.

In accordance with another aspect of the present invention, the universal adapter has a first threaded portion formed in a first portion of the exterior wall; a first groove formed in a second portion of the exterior wall, the first groove adjacent the first threaded portion; a second threaded portion formed in a first portion of the interior wall; and a second groove formed in a second portion of the interior wall; and wherein the bushing has a threaded exterior wall, the threaded exterior wall of the bushing configured to mate with the second threaded portion of the universal adapter and the first threaded portion formed in the first portion of the exterior wall screwed into the first threaded portion of the channel of the faucet body; and wherein the diverter has a body portion having first and second ends and a sidewall; a channeling structure extending from the first end; and a fluid adjustment structure adjacent the channeling structure; and wherein the channel of the faucet body has a second threaded portion adjacent the second end; and wherein the elbow spout has a coupling structure extending from the first end, the coupling structure having a threaded portion and a groove, the threaded portion of the coupling structure screwed into the second threaded portion of the channel of the faucet body.

In accordance with another aspect of the present invention, the fluid delivery system includes a first O-ring positioned in the first groove, a second O-ring positioned in the second groove, and a third O-ring positioned in the third groove.

In accordance with another aspect of the present invention, the fluid delivery system includes a locking feature formed on the exterior surface of the faucet body.

In accordance with another aspect of the present invention, the fluid delivery system includes at least one flange that serves as a locking feature.

In accordance with another aspect of the present invention, the fluid delivery system includes at least one flange that serves as a locking feature, wherein an opening extends through the at least one flange.

In accordance with another aspect of the present invention, the fluid delivery system includes at least one flange that serves as a locking feature, wherein the flange has a body portion extending in a direction of the channel of the faucet body.

In accordance with another aspect of the present invention, the fluid delivery system includes a protective material formed on a faucet body.

In accordance with another aspect of the present invention, the fluid delivery system includes a protective material formed on a faucet body and configured as an animal decoration or a figurine.

In accordance with another aspect of the present invention, the fluid delivery apparatus includes a protective material bonded to the faucet body and a spout.

In accordance with another embodiment of the present invention, a fluid transport system is provided and comprises a coupling structure having a first end connected to a second end by a channel; a universal adapter coupled to the coupling structure at the first end, the universal adapter having a first inlet/outlet port and a second inlet/outlet port and configured so that the first inlet/outlet port and the second inlet/outlet port can be mated to the coupling structure at the first end; an elbow spout having an inlet port and an outlet port, the inlet port coupled at the second end of the coupling structure; and a diverter having a pressure actuated position holding structure, the diverter coupled at the outlet port of the elbow spout.

In accordance with another aspect of the present invention, the universal adapter of the fluid transport system comprises: the universal adapter comprises: a threaded body having a first end, a second end, and a channel, the first end and the second end on opposite ends of the threaded body, and wherein the threaded body has an exterior wall and an interior wall, the interior wall bounding the channel; a first threaded portion formed in a first portion of the exterior wall; a first groove formed in a second portion of the exterior wall, the first groove adjacent the first threaded portion; a second threaded portion formed in a first portion of the interior wall adjacent the first end of the threaded body; a second groove formed in a second portion of the interior wall; and wherein the first inlet/outlet port is at the second end of the universal adapter and the second inlet/outlet port is at the second end of the universal adapter.

In accordance with another aspect of the present invention, the fluid transport system further includes a bushing screwed into the second threaded portion of the universal adapter, the second threaded portion of the universal adapter inserted into the first end of the coupling structure and the universal coupling structure screwed into the first end of the coupling structure.

In accordance with another aspect of the present invention, the fluid transport system includes a pipe inserted into the second end of the threaded body and secured by a set screw.

In accordance with another aspect of the present invention, the fluid transport system includes a bushing screwed into the second threaded portion of the universal adapter, the second end of the universal adapter inserted into the first end of the coupling structure and the universal coupling structure screwed into the first end of the coupling structure.

In accordance with another aspect of the present invention, the diverter of the fluid transport system comprises an elongated hollow body having a first end, a second end, an interior wall, and an exterior wall; a fluid funneling structure extending from the first end of the elongated hollow body; and the pressure actuated position holding structure configured to maintain a position of the elongated hollow body.

In accordance with another aspect of the present invention, the fluid transport system includes a first O-ring coupled between the coupling structure and the universal adapter; a second O-ring coupled between the coupling structure and the elbow spout; and a third O-ring coupled between the elbow spout and the diverter.

In accordance with another aspect of the present invention, the fluid transport system includes a protective material bonded to the coupling structure.

In accordance with another embodiment of the present invention, a method for manufacturing a fluid delivery system comprises providing a faucet having a diverter, the diverter including a cavity configured for reducing water pressure within the cavity; and bonding a protective material to the faucet to form a unitary structure.

In accordance with another aspect of the present invention, bonding the protective material to the faucet includes bonding a polymeric material to the faucet.

In accordance with another aspect of the present invention, bonding the protective material to the faucet includes forming the protective material in a shape selected from the group of shapes including a whale, a firetruck, and a dog.

FIG. 1 is a perspective view of a fluid delivery system 10 configured for use with a bathtub. By way of example, fluid delivery system 10 comprises a plumbing fixture such as, for example, a bathtub faucet. It should be noted that fluid delivery system 10 is not limited to a faucet for a bathtub, but may be a fixture suitable for use in a bathroom sink, a kitchen sink, an indoor fluid delivery system, an outdoor fluid delivery system, an industrial fluid delivery system, or the like. In addition, the fluid is not limited to being water. Other suitable fluids include solvents, alcohol, cooking fluids, oil, petroleum, fluids suitable for use in food preparation or food processing, a beverage, soup, or the like.

In accordance with an embodiment, fluid delivery system 10 includes a faucet body 12 having an end configured for mating with a universal adapter 34 and an end configured for mating with a spout such as, for example an elbow spout 20. Fluid delivery system 10 further includes a diverter 60 coupled to elbow spout 20. A pipe 42 is coupled to universal adapter 34. By way of example, faucet body 12 has ends 12A and 12B separated by a channel 12C (channel 12C is illustrated in at least FIG. 3). End 12A is configured to mate with a mounting structure and may be referred to as a mounting end or water inlet end and end 12B is configured to mate with spout 20 and may be referred to as spout outlet end or fluid outlet end. By way of example, end 12A may be mounted to a wall, i.e., the mounting structure to which end 12A is mounted may be a wall. Channel 12C extends from end 12A through faucet body 12 to end 12B and is configured so that a fluid such as, for example, water can flow therethrough. Faucet body 12 may be referred to as a body portion, an elongated hollow body, or the like. Bathtub faucet 10 may be manufactured from brass, chrome plated brass, a combination of copper, zinc, and lead, die-cast zinc, chrome-plated plastic, or the like. Techniques for manufacturing faucet body 12 include machining, hot forging, molding, or the like which may be followed by a plating process.

FIG. 1 further illustrates a universal adapter 34 mated with faucet body 12 through mounting end 12A, an elbow spout 20, and locking features 18. Gaps or openings 19 are between locking features 18 and faucet body 12. Locking features 18 help secure a protective material to faucet body 12 and elbow spout 20 and are further described with reference to FIG. 16. An embodiment of universal adapter 34 is further illustrated in FIGS. 2 and 3. Universal adapter 34 includes a set screw 48. Elbow spout 20 has a water intake end 20A configured for mating with end 12B of faucet body 12 and an end 20B through which water is released or output from bathtub faucet 10. End 20A of elbow spout 20 may be referred to as a water inlet end or a water intake end and end 20B of elbow spout 20 may be referred to as a water outlet end. A lip or flange 22 is formed at end 20B and serves as a locking feature. An access structure 24 is formed in elbow spout 20 and covered with a spout plug 26. A portion of a diverter 60 extending from end 20B is also shown in FIG. 1.

Referring now to FIG. 2, an exploded side view of bathtub faucet 10 in accordance with an embodiment of the present invention is illustrated. What is shown in FIG. 2 is faucet body 12, elbow spout 20, universal adapter 34, a bushing 40, and a pipe 42. Universal adapter 34 is configured for mating with faucet body 12. By way of example, universal adapter 34 has a threaded body portion 34C and opposing ends 34A and 34B, and a fluid conduction channel 35 that extends from end 34A to end 34B. End 34A may be referred to as a fluid inlet end and end 34B may be referred to as a fluid outlet end. The opening of channel 35 at end 34A may be referred to as a fluid inlet port and the opening of channel 35 at end 34B may be referred to as a fluid outlet port. In addition, universal adapter 34 has a threaded channel portion 36 (shown in FIGS. 3 and 4), a circular or annular groove 37 (shown in FIG. 3) configured for mating with an O-ring 38, and a circular or annular groove 39 (shown in FIG. 3) configured for mating with an O-ring 44. Universal adapter 34 further includes a circular or annular groove 39A (shown in FIG. 3) configured for mating with O-ring 44. It should be noted that universal adapter 34 can be used in the orientation shown in FIG. 3 in which O-ring 44 is mated with circular groove 39 or in the orientation shown in FIG. 22 in which O-ring 44 is mated with circular groove 39A. Thus, in a particular application an O-ring mates with either circular groove 39 or circular groove 39A. However, universal adapter 34 can be configured so that an O-ring 44 is mated with circular groove 39 and another O-ring 44 is mated with circular groove 39A. Universal adapter 34 is further described with reference to FIG. 3.

A bushing 40 is configured for mating with universal adapter 34. By way of example, bushing 40 is a cylindrically shaped structure having an inner sidewall 40A and an outer sidewall 40B. Inner sidewall 40A may be referred to as an interior wall or an interior sidewall and outer sidewall 40B may be referred to as an exterior wall or an exterior sidewall. Exterior sidewall 40B may be threaded or have a portion 41 that is threaded. Threaded portion 41 is configured to be screwed into threaded channel portion 36 (shown in FIG. 3), such that a seal is formed between bushing 40 and universal adapter 34 by O-ring 38. Threaded channel portion 36 is formed from an interior sidewall of universal adapter 34 and O-ring 38 provides a seal between bushing 40 and universal adapter 34 to inhibit fluid leakage. Bushing 40 has a cylindrical opening having a diameter that may be selected by an end user in accordance with an outer diameter of pipe 42. An O-ring 44 is slid over universal adapter 34 and inserted into circular groove 39 formed in a portion of end 34B so that when threaded body portion 41 of bushing 40 is screwed into end 12A of faucet body 12 a seal is formed to prevent fluid from leaking from plumbing fixture 10.

Briefly referring to FIG. 3, an exploded cross-sectional side view of universal adapter 34, bushing 40, a portion of faucet body 12, O-rings 38 and 44, and a portion of pipe 42 in accordance with a sleeved embodiment of the present invention is shown. In accordance with the sleeved embodiment, universal adapter 34 may be a circularly shaped or an annularly shaped structure having end 34A, a central region 34C, and an end 34B and may be referred to as an annular shaped member. A channel 35 extends from end 34A through threaded body portion 34C to end 34B. Channel 35 is configured to cooperate with channel 12C to carry the fluid and may be referred to as a duct. By way of example, universal adapter 34 is a cylindrically shaped structure having an inner sidewall 34SI and an outer sidewall 34SO. Inner sidewall 34SI may be referred to as an interior wall or an interior sidewall and outer sidewall 34SO may be referred to as an exterior wall or an exterior sidewall. A portion of interior sidewall 34SI may be threaded or have a portion 36 that is threaded at end 34B. Threaded portion 36 extends into channel 35 and terminates at grooved portion 37, wherein grooved portion 37 is configured for receiving O-ring 38. O-ring 38 helps prevent fluid flowing through pipe 42 from leaking Bushing 40 may be mated with universal adapter 34 by screwing threaded portion 41 of bushing 40 into threaded portion 36 of universal adapter 34. Prior to mating bushing 40 with universal adapter 34, O-ring 38 may be inserted into annular groove 37, such that a seal is formed between bushing 40 and universal adapter 34 by O-ring 38 after bushing 40 has been screwed into position. By way of example, universal adapter 34 is comprised of metal. In accordance with an embodiment, threaded portion 36 has a diameter D1, groove 37 has a diameter D2, and channel 35 has a diameter D3, where diameter D3 is less than diameter D2, and diameter D2 is less than diameter D1.

In a sleeved embodiment, pipe 42 is inserted into a portion 35A of the channel 35 at end 34A and held in place with a set screw 48.

The region of outer sidewall 34SO of universal adapter 34 that is threaded may be referred to as a threaded body. A groove 39 may be formed in the portion of outer sidewall 34SO of universal adapter 34 between threaded body portion 34C and end 34B and a groove 39A may be formed in the portion of outer sidewall 34SO that is between threaded body portion 34C and end 34A. O-ring 44 is slid over universal adapter 34 and positioned in either groove 39 or 39A to help prevent the fluid from leaking from plumbing fixture 10. Threaded body portion 34C is configured to secure universal adapter 34 to faucet body 12, i.e., threaded body portion 34C is configured to be screwed into the threaded portion 12D of channel 12C. Faucet body 12 has a female threaded portion 12E at end 12B. FIG. 3 further illustrates a threaded hole 34SS extending from interior sidewall 34SI to exterior sidewall 34SO of universal adapter 34. A set screw 48 may be screwed into threaded hole 34SS.

Figure 4:
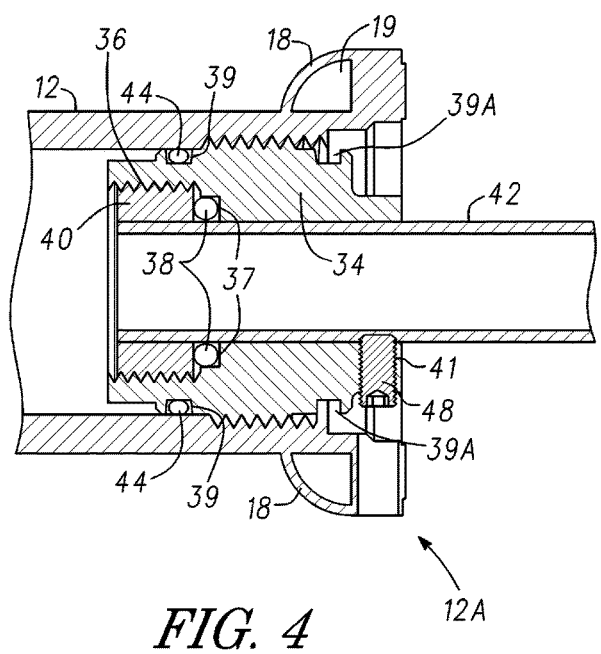
FIG. 4 is an unexploded cross-sectional side view of a plumbing fixture in accordance with an embodiment of the present invention.

FIG. 4 is an unexploded cross-sectional side view of universal adapter 34, bushing 40, a portion of faucet body 12, grooves 39 and 39A, O-rings 38 and 44, and a portion of pipe 42 in accordance with a sleeved embodiment of the present invention. It should be noted that the embodiment of FIG. 4 is referred to as a sleeved embodiment because pipe 42 is inserted into channels 12C and 35 and held in place with set screw 48.

Figure 5:
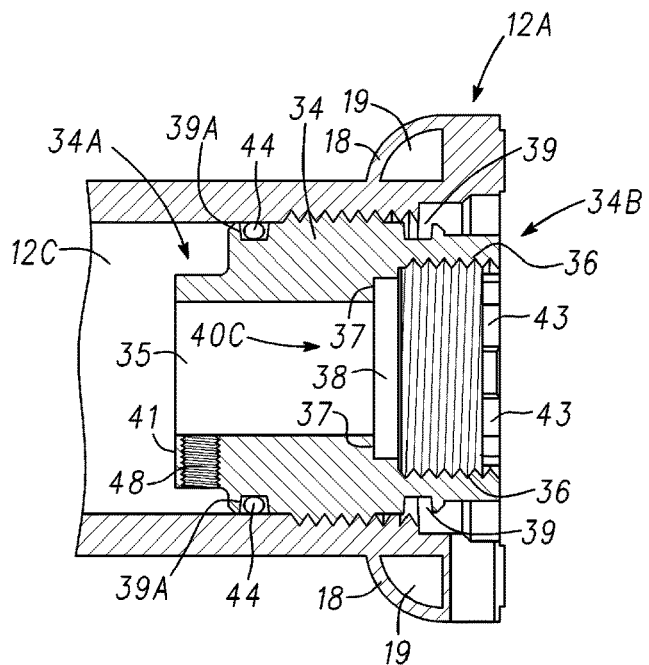
FIG. 5 is a cross-sectional side view of a universal adapter and a bushing in accordance with an embodiment of the present invention.
Figure 6:
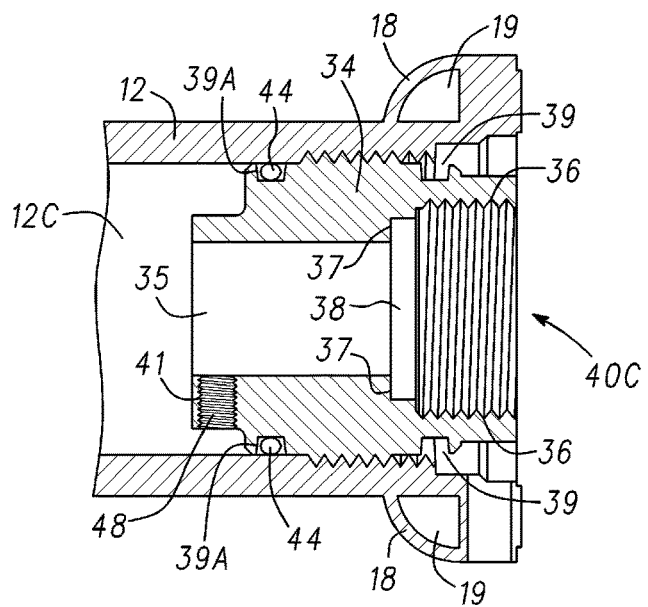
FIG. 6 is a cross-sectional side view of a universal adapter and a bushing in accordance with an embodiment of the present invention.

For the sake of completeness, FIGS. 5 and 6 are included to illustrate universal adapter 34 configured for use in sleeveless embodiments in accordance with embodiments of the present invention. FIG. 5 illustrates universal adapter 34 screwed into faucet body 12 from end 12A and bushing 40 screwed into universal adapter 34 from end 34B. It should be noted that universal adapter 34 and faucet body 12 have been described with reference to FIGS. 1-4. Universal adapter 34 in FIG. 5 is rotated 180 degrees compared to the universal adapter 34 shown in FIG. 4. It should be further noted that in the sleeveless embodiment, an end of pipe 42 shown in FIG. 4 is threaded so that it can be screwed into bushing 40. In addition, to bushing 40 being configured so that a threaded pipe can be screwed into it, bushing 40 has handles 43 to aid in screwing bushing 40 into universal adapter 34. Bushing 40 is configured to have a channel 40C configured to accept a pipe 42 having an outer diameter of, for example, one-half inch.

FIG. 6 illustrates universal adapter 34 screwed into faucet body 12 from end 12A and bushing 40 screwed into universal adapter 34 from end 34B. It should be noted that universal adapter 34 and faucet body 12 have been described with reference to FIGS. 1-4. Like the embodiment shown in FIG. 5, universal adapter 34 in FIG. 6 is rotated 180 degrees compared to the universal adapter 34 shown in FIG. 4. It should be further noted that in the sleeveless embodiment, an end of pipe 42 shown in FIG. 4 is threaded so that it can be screwed into bushing 40. Bushing 40 is configured to have a channel 40C configured to accept a pipe 42 having an outer diameter of, for example, three-quarter inches. FIG. 6 illustrates a sleeveless embodiment in which handles 43 are omitted.

Referring again to FIG. 2, a coupling structure 50 extends from end 20A of elbow spout 20. By way of example, coupling structure 50 is comprised of a threaded protrusion 52 having an end 54, wherein a notch 56 is formed in end 54 for mating with an O-ring 58. Coupling structure 50 is further described with reference to FIG. 14.

A side view of diverter 60 is shown in FIG. 2 and shows that diverter 60 has a body portion 60A, a water inlet portion 63, a water outlet portion 64, and a coupling structure 66 protruding from body portion 60A and configured to mate with elbow spout 20, and a load spring 68 for securing diverter 60 to elbow spout 20. Diverter 60 is further described with reference to FIGS. 7-13.

Figure 7:
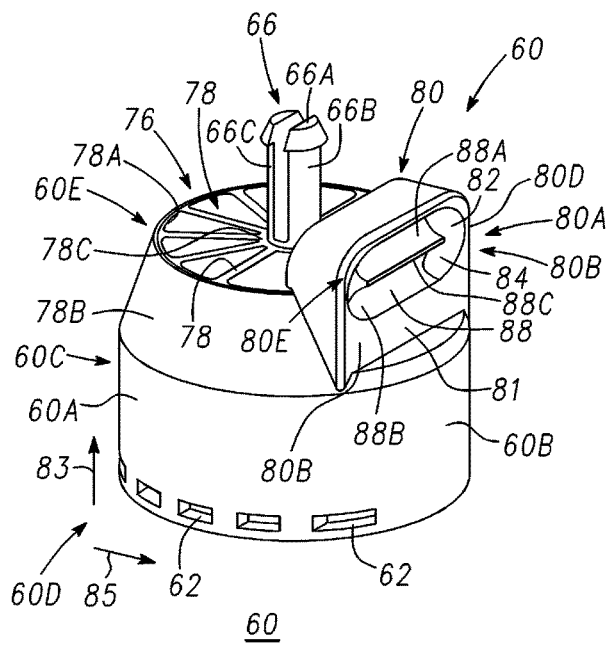
FIG. 7 is a perspective view of a diverter in accordance with an embodiment of the present invention.
Figure 8:
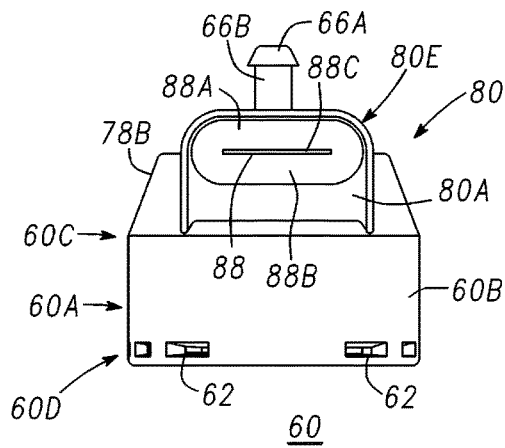
FIG. 8 is a side view of the diverter of FIG. 7 in accordance with an embodiment of the present invention.
Figure 9:
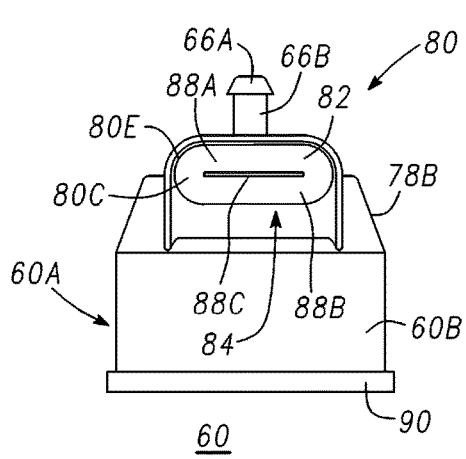
FIG. 9 is a side view of the diverter of FIGS. 7-8 in accordance with an embodiment of the present invention.
Figure 10:
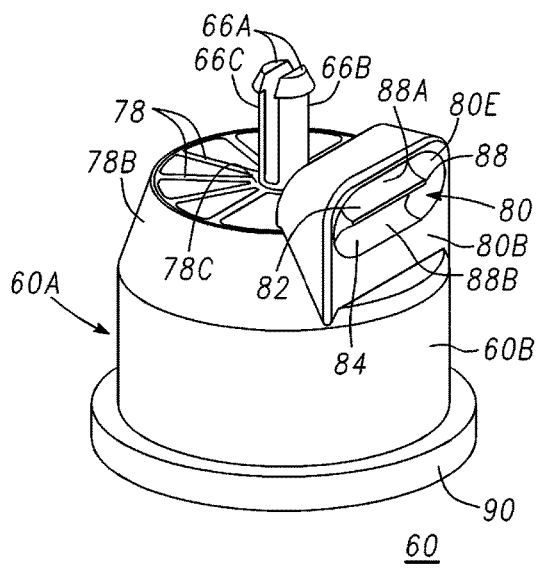
FIG. 10 is a perspective view of the diverter of FIGS. 7-9 in accordance with an embodiment of the present invention.

FIG. 7 is a perspective view of diverter 60 in accordance with an embodiment of the present invention. FIG. 8 is a side view of diverter 60 of FIG. 7 in accordance with an embodiment of the present invention. FIG. 9 is a side view of diverter 60 of FIGS. 7-8 at a later stage of manufacture in accordance with an embodiment of the present invention. FIG. 10 is a perspective view of diverter 60 of FIG. 9 in accordance with an embodiment of the present invention. FIG. 11 is a perspective view of diverter 60 of FIGS. 9 and 10 from a different view in accordance with an embodiment of the present invention. FIG. 12 is a top view of diverter 60 of FIGS. 8-11 in accordance with an embodiment of the present invention. FIG. 13 is a bottom view of diverter 60 of FIGS. 8-11 in accordance with an embodiment of the present invention. For the sake of clarity, FIGS. 7-13 are described together. In accordance with an embodiment, diverter 60 has a cylindrically shaped body portion 60A having an outer sidewall 60B and ends 60C and 60D. It should be noted that the shape of diverter 60 is not a limitation and that diverter 60 may be oval shaped, square shaped, rectangularly shaped, octagonally shaped, hexagonally shaped, a polygon shape, or the like. Locking features 62 are formed at end 60D. By way of example, locking features 62 are openings or holes that extend through cylindrically shaped body portion 60A.

Diverter 60 includes a channeling structure 76 extending from end 60C of cylindrically shaped body portion 60A. Channeling structure 76 may be referred to as a fluid channeling structure, a fluid funneling structure, or a funneling structure. By way of example, channeling structure 76 has a tapered sidewall 78B extending from end 60C of cylindrically shaped body portion 60A and one or more fluid routing elements 78 that extend from portions of tapered sidewall 78B to central termination structure 78C that form one or more fluid carrying channels 78A. Fluid carrying channels 78A may be referred to as fluid routing channels. Because sidewall 78B is a tapered structure, a diameter of diverter 60 at end 60C is greater than a diameter of diverter 60 at a region 60E. A coupling structure 66 extends from channeling structure 76, wherein coupling structure 66 has latching features 66A. By way of example, coupling structure 66 is comprised of a pair of extensions 66B and 66C that each have opposing ends. One end of each of extensions 66B and 66C is attached to central termination structure 78C of channeling structure 78 and the opposing ends of each of extensions 66B and 66C are spaced apart from channeling structure 76. The ends of extensions 66B and 66C that are not directly attached to channeling structure 76 each have a lip or latching feature 66A. Because extensions 66B and 66C are connected at one end, the ends at which latching features 66A are located can be moved toward and away from each other. Thus, extensions 66B and 66C can be moved towards each other, inserted into load spring 68, which load spring 68 can be held in position around extensions 66B and 66C by letting them move apart.

In accordance with this example, tapered sidewall 78B does not extend around the full circumference of cylindrically shaped body portion 60A. A fluid pressure adjustment structure 80 is formed adjacent a portion of channeling structure 76 from which the tapered sidewall 78B is absent. Fluid pressure adjustment structure 80 may be referred to as a pressure actuated position holding structure. In accordance with an embodiment, fluid pressure adjustment structure 80 is comprised of a mating structure 80A that extends in a vertical direction from cylindrically shaped body portion 60A and in a horizontal direction from tapered side wall 78B. It should be noted that the terms vertical direction and horizontal direction are relative terms used to aid in the description of fluid pressure adjustment structure 80. To further understand the use of the terms vertical direction and horizontal direction, an arrow 83 illustrates the vertical direction and an arrow 85 illustrates a horizontal direction. Thus, the terms vertical direction and horizontal direction describe directions relative to each other. Mating structure 80A has a sidewall 80B separated from an opposing sidewall 80C by a body region 80D.

An oval shaped opening 80E extends from sidewall 80B into body region 80D. Oval shaped opening 80E is configured to mate with O-ring 70 shown in FIG. 2. Fluid pressure adjustment structure 80 further includes a pair of elongated cavities 82 and 84 formed in oval shaped opening 80E, wherein elongated cavity 82 is separated from elongated cavity 84 by a divider 88. Divider 88 has a tapered sidewall 88A and a tapered sidewall 88B that meet to form a surface 88C. It should be noted that surface 88C of divider 88 and sidewall 80B may be in the same plane or they may be in different planes.

FIG. 8 further illustrates sidewall 60B having locking features 62, tapered sidewall 78B, sidewall 80A, divider 88, tapered sidewalls 88A and 88B, surface 88C, latching feature 66A, and extension 66B.

FIG. 9 further illustrates diverter 60 as shown in FIG. 8, but with a protective material 90 formed over end 60D. By way of example, protective material 90 is polyurethane, wherein portions of the polyurethane fills locking features 62. It should be appreciated that locking features 62 aid in securing protective material 90 to diverter 60. Protective material 90 protects an end user from injury that may occur if the end user comes in contact with diverter 60. Protective material 90 is not limited to being polyurethane. Other suitable materials for protective material 90 include, but are not limited to, rubber, an elastomeric material, plastic, polyimide, foam, or the like. Examples of injuries that protective material 90 protects against include abrasions, scrapes, scratches, bumps, bruises, concussion, scalding that may occur if diverter 60 is, for example, hot.

FIG. 10 further illustrates body portion 60A, sidewall 60B, extensions 66B and 66C, latching feature 66A, channeling structure 76, fluid routing elements 78, fluid carrying channels 78A, tapered sidewall 78B, fluid pressure adjustment structure 80, surface 80D, divider 88, tapered sidewalls 88A and 88B, surface 88C, and protective material 90.

FIG. 11 further illustrates sidewall 60B, extensions 66B and 66C, latching feature 66A, channeling structure 76, fluid routing elements 78, fluid carrying channels 78A, tapered sidewall 78B, fluid pressure adjustment structure 80, and protective material 90.

FIG. 12 further illustrates a top view of diverter 60 in accordance with an embodiment of the present invention. What is shown in FIG. 12 are fluid routing elements 78, fluid carrying channels 78A, tapered sidewall 78B, fluid pressure adjustment structure 80, and protective material 90. In addition, FIG. 12 illustrates that end 60C has a diameter $D_1$ and region 60E has a diameter $D_2$, and that diameter $D_2$ is less than diameter $D_1$.

FIG. 13 further illustrates a bottom view of diverter 60 in accordance with an embodiment of the present invention. What is shown in FIG. 13 are fluid routing elements 78, fluid conduction channels 78A, central termination structure 78C, fluid pressure adjustment structure 80, and protective material 90.

FIG. 14 is an unexploded cross-sectional view of faucet body 12, elbow spout 20, diverter 60, and pipe 42 of FIG. 1 in a bathing configuration in accordance with an embodiment of the present invention. FIG. 15 is an unexploded cross-sectional view of faucet body 12, elbow spout 20, diverter 60, and pipe 42 of FIG. 1 in a shower configuration in accordance with an embodiment of the present invention. For the sake of clarity, FIGS. 14 and 15 are described together. What is shown in FIGS. 14 and 15 are cross-sectional side views of faucet body 12, elbow spout 20, universal adapter 34, diverter 60, and pipe 42. FIGS. 14 and 15 further illustrate channel 12C of faucet body 12 and shows threads 12D in the portion of channel 12C at end 12A of faucet body 12 and threads 12E in the portion of channel 12C at end 12B of faucet body 12.

In addition, FIGS. 14 and 15 further illustrate coupling structure 50 extending from water inlet end 20A of elbow spout 20. Coupling structure 50 may be a cylindrically shaped structure extending from a sidewall 50A of elbow spout 20. Coupling structure 50 has a protrusion 53 or coupling structure extending from sidewall 50A of elbow spout 20. Protrusion 53 has an interior sidewall having an inner diameter and an exterior sidewall having an outer diameter. Coupling structure 50 has threads or grooves 50C formed in a portion of the exterior sidewall and a notch or groove 50D formed in another portion of coupling structure 50. Notch 50D is formed from a portion of the exterior sidewall that is distal from sidewall 50A. By way of example, groove 50D has a circular or annular shape. An O-ring 58 is slid over coupling structure 50 and placed in groove 50D.

Coupling structure 50 includes a channel region 50E within the exterior and interior sidewalls, wherein channel region 50E extends from channel 12C of faucet body 12. An opening 51 is formed in sidewall 50A that allows a fluid to flow into a reservoir region 20C of elbow spout 20 from channel region 50E. A fluid such as, for example, water flows through channel 12C and into channel region 50E. In FIG. 14 plumbing fixture 10 is configured in a bath configuration, thus the fluid that flows into reservoir region 50E is directed through elbow spout 20 and out end 20B of elbow spout 20. It should be noted that when diverter 60 is positioned in a bath position, surface 88C of divider 88 is vertically spaced apart from sidewall 50A.

FIGS. 14 and 15 further illustrate that receptacle 92 has a latching structure 93 at the end that is within reservoir region 20C and an opening 94 in elbow spout 20, where latching structure 93 is configured for mating with the latching features 66A of extensions 66B and 66C. A sealing cap 96 is inserted into and seals opening 94.

In operation, fluid delivery system 10 may be configured in a bathing configuration or a showering configuration, i.e., diverter 60 may be in a first position or a bathing position or a second position or a showering position. FIG. 14 illustrates fluid deliver system 10 in the bathing configuration and FIG. 15 illustrates fluid delivery system 10 in a showering configuration. In a bathing configuration, a user configures the fluid delivery system to deliver or channel a fluid such as, for example, water to faucet body 12 and towards an opening or orifice 51. In a bathing embodiment, the fluid is water that is delivered into faucet body 12, through elbow spout 20, through a diverter 60 and into a bathtub. In the bathing configuration, diverter 60 is positioned so that opening 51 is not blocked by fluid pressure adjustment structure 80.

In a showering configuration, diverter 60 is pushed up into elbow spout 20 so that fluid pressure adjustment structure 80 blocks the flow of fluid through diverter 60. In the showering configuration, mating structure 80 mates with opening 51 such that fluid flows into elongated cavity 82. Tapered sidewalls 88A and 88B and surface 88C of divider 88 cooperate to lower the pressure within elongated cavity 82 to lower the pressure in elongated cavity 82. The reduced pressure helps hold diverter 60 in the up position so that water is diverted from elbow spout 20 towards a shower head. Accordingly, diverter 60 may be referred to as a pressure actuated position holding structure. Thus, the water flows from the shower head into the bathtub rather than from faucet body 12 and elbow spout 20. Diverter 60 being in the up position is referred to as a push-up diverter and inhibits fluid from flowing through the elbow spout in the up position.

Figure 17:
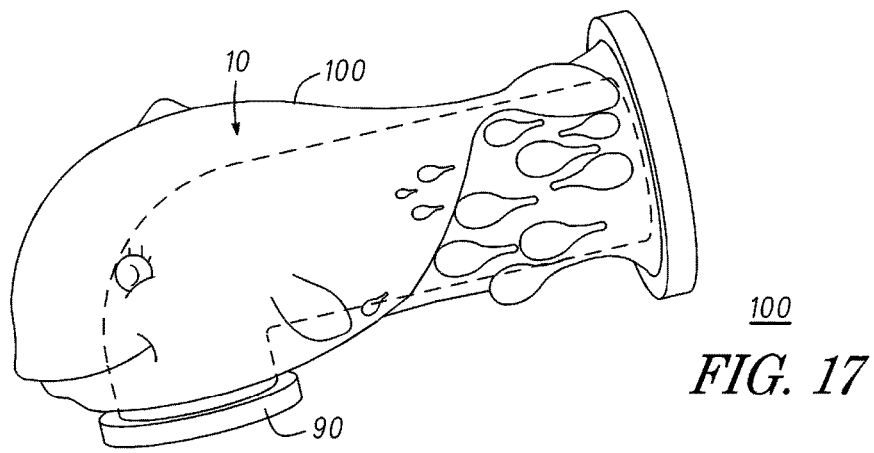
FIG. 17 is a perspective view of a plumbing fixture in accordance with another embodiment of the present invention.
Figure 18:
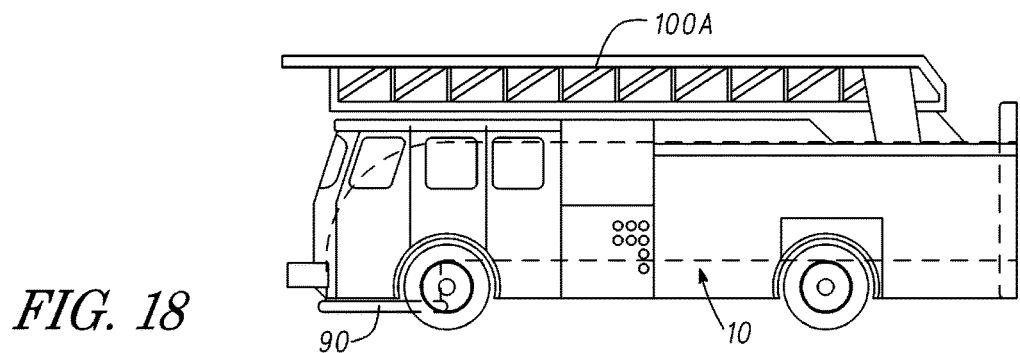
FIG. 18 is a side view of a plumbing fixture in accordance with another embodiment of the present invention.
Figure 19:
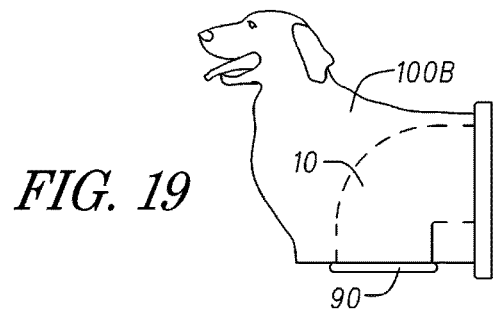
FIG. 19 is a side view of a plumbing fixture in accordance with another embodiment of the present invention.
Figure 20:
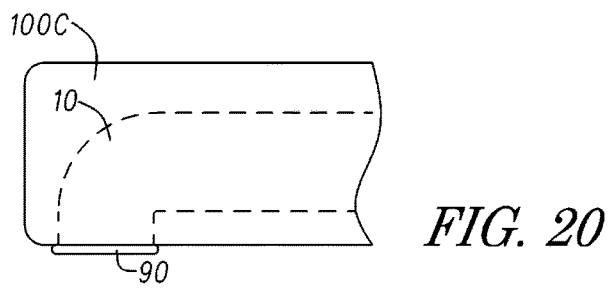
FIG. 20 is a side view of a plumbing fixture in accordance with another embodiment of the present invention.

FIG. 16 is a cross-sectional view of plumbing fixture 10 protected by a protective material 100 in accordance with an embodiment of the present invention. FIG. 17 is a perspective view of plumbing fixture 10 protected by protective material 100. By way of example protective material 100 is polyurethane molded around plumbing fixture 10 to form a unitary structure. Protective material 100 protects the occupants of a bathtub from injury that may be caused by contacting plumbing fixture 10 due to a fall or when hot water is flowing through a faucet. In addition, protective material 100 can be configured to provide protection against mold and mildew. It should be noted that the shape of protective structure 100 is not a limitation and that it can be shaped as a bird, an airplane, a motor vehicle, a dog, a cat, a horse, or other desired animal figure, human shaped, football shaped, etc. FIG. 18 shows a protective structure 100A shaped like a firetruck. FIG. 19 shows a protective structure 100B shaped like a dog. FIG. 20 shows a protective material 100D shaped to cover bathtub faucet 10. Protective structures such as, protective structures 100, 100A, 100B, and 100C are not limited to being formed from polyurethane. Other suitable materials for protective structures 100, 100A, 100B, and 100C include, but are not limited to, rubber, an elastomeric material, plastic, polyimide, foam, or the like.

Figure 21:
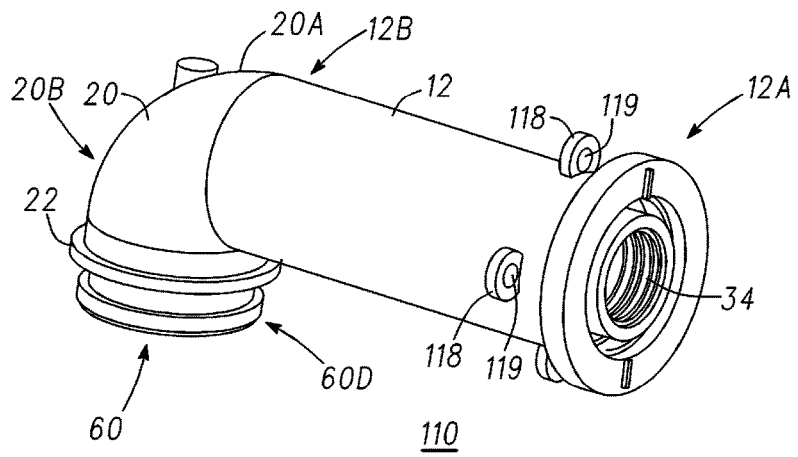
FIG. 21 is a perspective view of a plumbing fixture in accordance with another embodiment of the present invention.

FIG. 21 is a perspective view of a plumbing fixture 110 in accordance with another embodiment of the present invention. By way of example, plumbing fixture 110 is a bathtub faucet. It should be noted that plumbing fixture 110 is not limited to being a faucet for a bathtub, but may be a fixture suitable for use in a bathroom sink, a kitchen sink, an indoor fluid delivery system, an outdoor fluid delivery system, or the like. In addition, the fluid is not limited to being water. Other suitable fluids include solvents, alcohol, cooking fluids, oil, petroleum, liquids used in the food industry, or the like. Bathtub faucet 110 is similar to bathtub faucet 10 except that the configuration of mold lock features 118 is different from the configuration of mold lock features 18, the configuration of diverter 60 is altered, and bathtub faucet 110 is in a sleeveless configuration. Thus, bathtub faucet 110 is comprised of a faucet body 12 having opposing ends 12A and 12B. End 12B is configured to mate with an elbow spout 20 and may be referred to as elbow end or water outlet end and end 12A is configured to mate with a mounting structure and may be referred to as a mounting end or water inlet end. By way of example, the mounting structure is a wall. Bathtub faucet 110 has a channel or opening such as, for example, channel 12C, extending from end 12A through faucet body 12 to end 12B. Channel 12C is configured so that a fluid such as, for example, water can flow therethrough. Bathtub faucet 110 may be manufactured from brass, chrome plated brass, a combination of copper, zinc, and lead, die-cast zinc, chrome-plated plastic, or the like. Techniques for manufacturing faucet body 12 include machining, hot forging, molding, or the like which may be followed by a plating process.

Faucet body 12 has mold lock features 118 with holes 119 extending therethrough. Bathtub faucet 110 differs from bathtub faucet 12 of FIG. 1 in that holes 119 extending through locking features 118 of faucet body 12 face in a direction substantially perpendicular to ends 12A and 12B of faucet body 12, whereas holes 119 of locking features 118 face ends 12A and 12B. Thus, end 12A can be viewed from end 12B by looking through holes 119, whereas end 12A cannot be viewed from end 12B by looking through holes 19.

Figure 22:
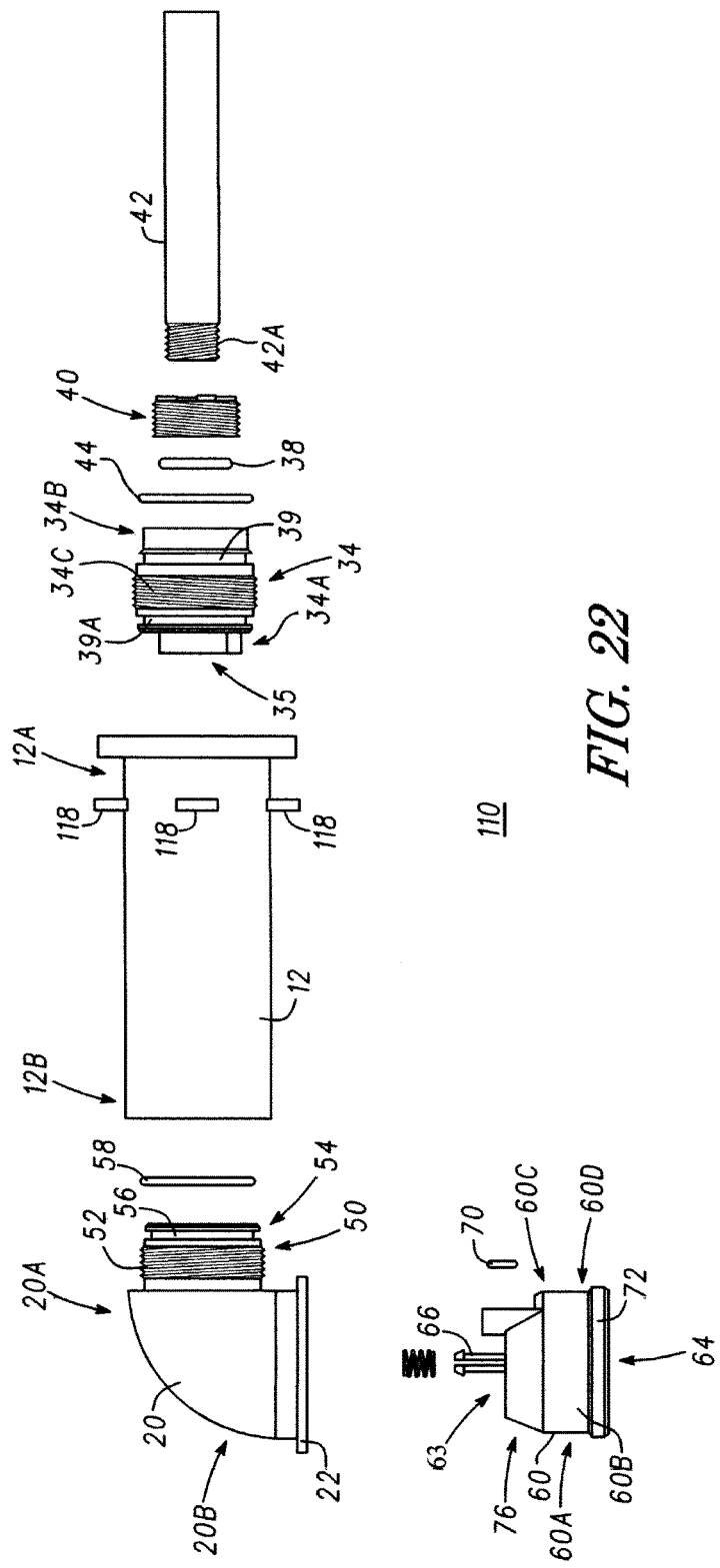
FIG. 22 is an exploded side view of the plumbing fixture of FIG. 21 in accordance with an embodiment of the present invention.

Referring now to FIG. 22, an exploded side view of bathtub faucet 110 is illustrated. What is shown in FIG. 22 is faucet body 12, elbow spout 20, universal adapter 34, a bushing 40, and a pipe 42. Universal adapter 34 is configured for mating with faucet body 12 in a sleeveless configuration. By way of example, universal adapter 34 has a threaded body portion 34C having opposing ends 34A and 34B, and a fluid conduction channel that extends from end 34A to end 34B. In a sleeveless configuration, end 34B serves as a fluid inlet end and end 34A serves as a fluid outlet end. The opening of the channel at end 34B serves as a fluid inlet port and the opening of the channel at end 34A serves as a fluid outlet port in a sleeveless configuration. In addition, universal adapter 34 has a threaded channel portion 36 (shown in FIGS. 3 and 4) and a circular or annular extension 37 configured for mating with an O-ring 44. Universal adapter 34 was described with reference to FIGS. 3 and 4. End 34A may be referred to as an inlet/outlet port and end 34B may be referred to as an inlet/outlet port because they can serve as either an inlet port or an outlet port depending on the configuration of the fluid delivery system in which they are used.

A bushing 40 is configured for mating with universal adapter 34, where bushing 40 is a cylindrically shaped structure and has a threaded exterior portion configured for mating with threaded channel portion 36 and O-ring 38. It should be noted that threaded channel portion 36 is formed from an interior sidewall of universal adapter 34 and that O-ring 38 provides a seal between bushing 40 and universal adapter 34 to inhibit fluid leakage. Bushing 40 has a cylindrical opening having a diameter that may be selected by an end user in accordance with an outer diameter of pipe 42. An O-ring 44 is inserted into circular groove 39A so that when threaded body portion 34C is screwed into end 12A of faucet body 12 a seal is formed to prevent fluid from leaking from plumbing fixture 10.

In a sleeveless embodiment, pipe 42 has a threaded end 42A that is screwed into bushing 40.

Figure 23:
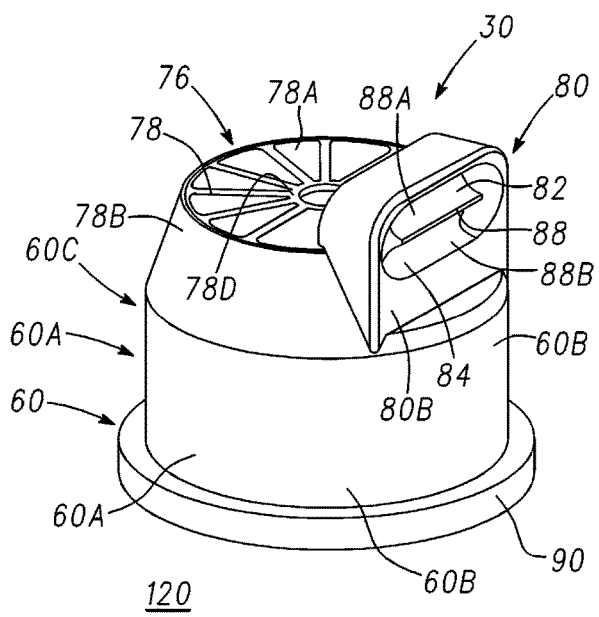
FIG. 23 is an isometric view of a diverter in accordance with another embodiment of the present invention.
Figure 24:
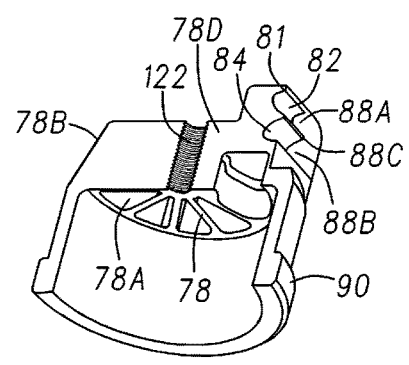
FIG. 24 is an isometric view of the diverter of FIG. 23.

FIG. 23 is a perspective view of diverter 120 in accordance with another embodiment of the present invention. What is shown in FIG. 23 is channeling structure 76 having tapered sidewall 78B extending from end 60C of cylindrically shaped body portion 60A and one or more fluid routing elements 78 that extend from portions of tapered sidewall 78B to central termination structure 78D that form a plurality of fluid conduction channels 78. Diverter 120 differs from diverter 60 described with reference to FIGS. 7-12 in that coupling structure 66 is replaced with a threaded hole 122. FIG. 24 is a perspective view of diverter 120 further illustrating threaded hole 122 extending into a central portion of channeling structure 76.

FIG. 25 is an exploded side view of bathtub faucet 200 in accordance with an embodiment of the present invention. What is shown in FIG. 25 is faucet body 12, spout $20_1$, universal adapter 34, a diverter 220, a bushing 40, and a pipe 42. Fluid body 12, universal adapter 34, bushing 40, and pipe 42 are described with reference to FIGS. 1 and 2. Spout $20_1$ differs from spout 20 of FIG. 2 because spout $20_1$ is a straight spout having ends $20_1A$ and $20_1B$ whereas spout 20 of FIG. 2 is an elbow spout. Like elbow spout 20 of FIG. 2, spout $20_1$ has a coupling structure 50 that extends from end $20_1A$ of elbow spout 20. Coupling structure 50 has been described with reference to FIGS. 2 and 14. Spout $20_1$ has a wall 202 at or near end $20_1A$ that blocks fluid flow and an opening 51A in a portion of wall 202. In addition, spout $20_1$ has a channel $20_1C$ through which fluid flows. Channel $20_1C$ has a sidewall internal to spout $20_1$ and an end 208. An opening 210 is formed in a portion of the internal sidewall.

In accordance with an embodiment, diverter 220 is configured to have a cylindrically shaped body portion 220A between an inlet end 220B and an outlet end 220C. It should be noted that the shape of diverter 220 is not a limitation and that diverter 220 may be oval shaped, square shaped, rectangular shape, octagonally shaped, hexagonally shaped, a polygon shape, or the like. Locking features 223 may be formed at end 220C. By way of example, locking the features are openings or holes 223 that extend through cylindrically shaped body portion 220A.

Diverter 220 may include a channeling structure that is similar to channeling structure 76 except that it does not have tapered sidewalls. It should be noted that this is not a limitation of the present invention. The channeling structure 76 may include one or more fluid routing elements 78 and a coupling structure 66 extending from channeling structure 76. In accordance with an embodiment, diverter 220 includes a fluid pressure adjustment structure. By way of example the fluid pressure adjustment structure is configured like fluid pressure adjustment structure 80 described with reference to FIGS. 7-13. The sidewalls of spout $20_1$ are inserted into diverter 220 so that diverter 220 is coupled to spout $20_1$ using coupling structure 66 and a receptacle 230.

Although faucet 200 is shown in a horizontal configuration, it may be in a vertical configuration suitable for use in a fluid delivery system used in bathtubs. Faucet 200 in a horizontal configuration can be used in fluid delivery systems such as, for example, fluid delivery systems used in industrial applications, food processing or food delivery applications, or the like.

Figure 27:
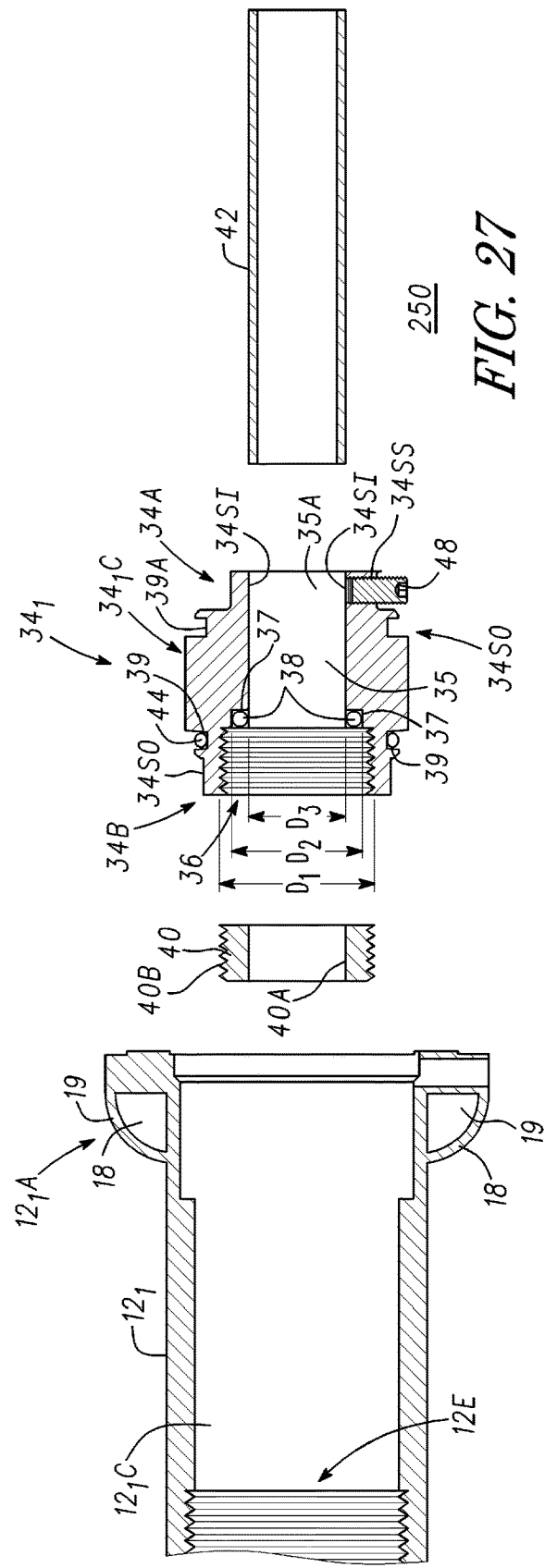
FIG. 27 is an exploded cross-sectional view of a portion of a plumbing fixture in accordance with an embodiment of the present invention.

FIG. 26 is an exploded side view of a bathtub faucet 250 in accordance with another embodiment of the present invention. FIG. 27 is an exploded cross-sectional view of bathtub faucet 250. What is shown in FIG. 26 is a faucet body $12_1$, elbow spout 20, a universal adapter $34_1$, diverter 60, a bushing 40, and a pipe 42. Elbow spout 20, bushing 40, and pipe 42 are described with reference to FIGS. 1 and 2. Fluid body $12_1$ differs from fluid body 12 in that female threads are absent from the portion of channel 12C at end 12A and male threads are absent the outer sidewall of universal adapter 34, i.e., threaded body portion 34C is absent. Thus, universal adapter $34_1$ has a body portion $34_1C$. Universal adapter $34_1$ is inserted into channel 12 at end 12A and held in place by friction. Alternatively, universal adapter 34 can be configured to be held in place with a set screw, a bonding agent, or the like. It should be noted that faucet body $12_1$ and elbow spout 20 can be configured so that threads are absent from end 12B and extension 50 and elbow spout can be inserted into the portion of channel 12C and held in place using a friction fit, a set screw, a bonding agent, or the like.

Figure 28:
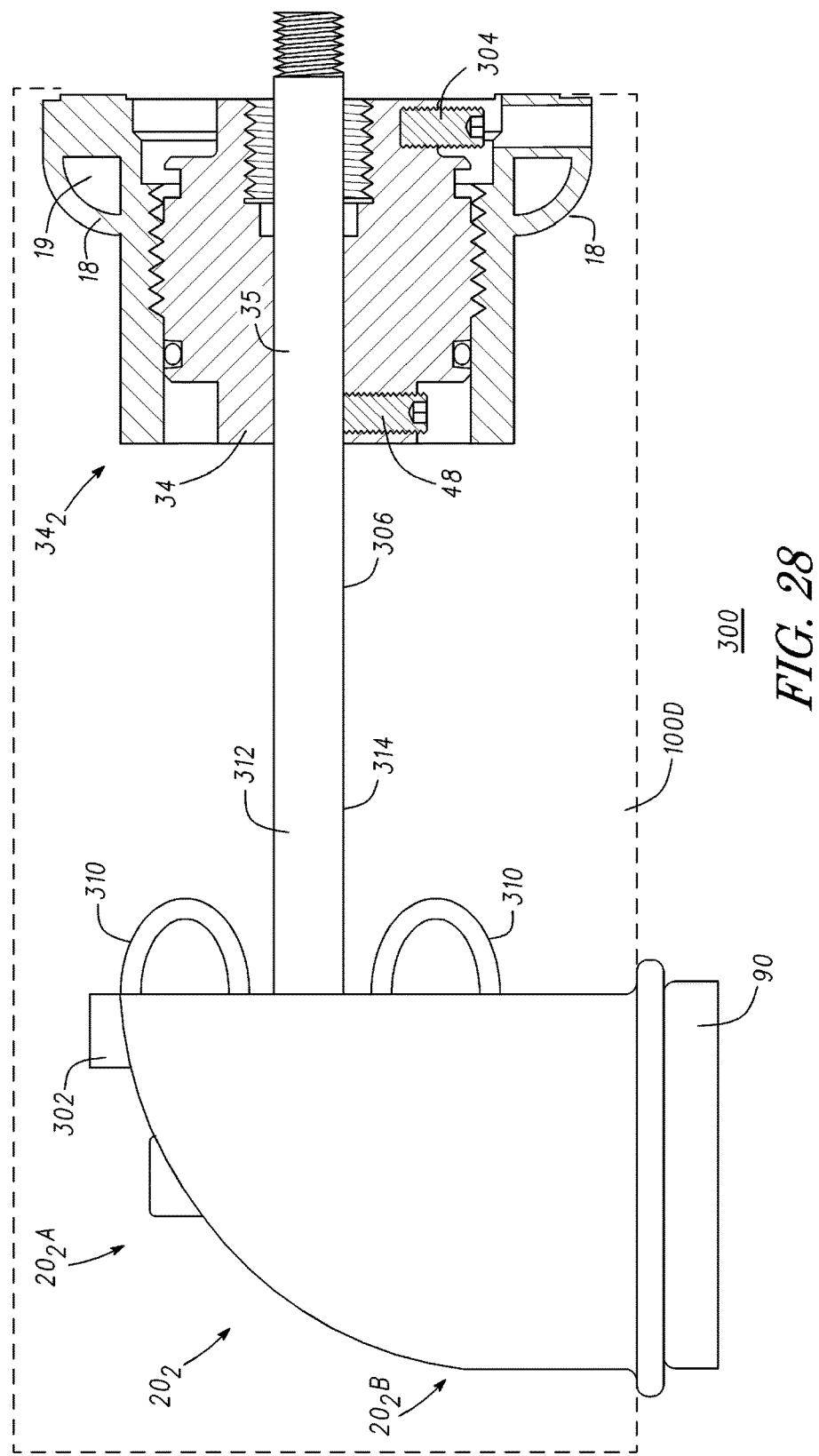
FIG. 28 is an unexploded view of a portion of a plumbing fixture in accordance with an embodiment of the present invention.

FIG. 28 is a partial cross-sectional side view of a faucet 300 in accordance with another embodiment of the present invention. Faucet 300 includes an elbow spout $20_2$, a universal adapter $34_2$, a diverter 60, and a protective structure 100D. Elbow spout $20_2$ may be similar to elbow spout 20 or elbow spout $20_1$ and is configured to include an orientation feature 302. Orientation feature 302 is included to orient elbow spout $20_2$ in a mold cavity during the formation of faucet 300. Similarly, universal adapter $34_2$ is configured to include an orientation feature 304 to orient spout $20_2$ in a mold cavity. Protective structure 100D is configured to include a channel to convey a fluid from, for example, a pipe coupled to universal adapter $34_2$ to elbow spout $20_2$. It should be appreciated that protective structure 100D may be a figurine shaped like an animal, a television character, an automobile, etc.

Faucet 300 may be manufactured using placing spout $20_2$, universal adapter $34_2$, and a retractable rod 306 into a mold configured to receive them. Rod 306 is configured to mate with an opening or channel at end $20_2A$ of elbow spout $20_2$ and to extend through channel 35 of universal adapter $34_2$. It should be noted that the mold is configured so that spout $20_2$ and universal adapter $34_2$ are laterally spaced apart from each other. Spout $20_2$ may include a locking feature such as, for example, locking features 310 to promote bonding of the protective material of protective structure 100D to spout $20_2$. Locking features 310 may be ears with openings extending therethrough.

Retractable rod 306 may be a solid cylindrical object, a solid cylindrical object having an exterior surface with male threads, a hollow cylindrical object, a hollow cylindrical object with threads, or the like. Retractable rod 306 is removed from faucet 300 after molding to leave a channel 314 extending from channel 35 of universal adapter $34_2$ to an opening in elbow spout $20_2$. In accordance with embodiments in which the exterior surface of retractable rod 306 is threaded, rod 306 may be removed from faucet 300 by unscrewing it. In accordance with embodiments in which the exterior surface of retractable rod 306 is smooth, the material of rod 306 may be selected so that the protective material does not bond to it, or the material of rod 306 may be treated so that the protective material does not bond to it.

By now it should be appreciated that a fluid delivery apparatus and a method for manufacturing the fluid delivery apparatus have been provided. A fluid delivery system in accordance with embodiments of the present invention may include the incorporation of a diverter that can be activated and released in a quick fashion and can be configured to be compatible with a plurality of plumbing fixture sizes. The protective material provides protection against mold and mildew and protects users from injury caused by, for example, bumps, bruises, scrapes, cuts, burns, etc.

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A fluid delivery system, comprising:
a faucet body having a first end, a second end, and a channel that extends from the first end of the faucet body to the second end of the faucet body, wherein the faucet body has an exterior surface and an interior surface, and the channel has a first threaded portion at the first end and a second threaded portion at the second end;
a universal adapter comprising a threaded body having a first end, a second end, and a duct, the first end and the second end on opposite ends of the threaded body, wherein the threaded body has an exterior wall and an interior wall, the interior wall bounding the duct, the universal adapter configurable for sealingly coupling with threaded pipes at the first end or sealingly coupling with and being fastened to unthreaded pipes at the second end, wherein the universal adapter is configurable for sealingly mating with pipes having different diameters, and wherein the universal adapter is coupled to the faucet body;
an elbow spout having a first end and a second end, the first end of the elbow spout coupled to the faucet body; and
a diverter having a body portion, a water inlet portion, a water outlet portion, and a coupling structure, the body portion positioned between the water inlet portion, and the water outlet portion, the diverter configured to be positioned in the second end of the elbow spout.

2. The fluid delivery system of claim 1, wherein the duct at the first end of the universal adapter is threaded and further including a bushing having a first end and a second end, the bushing received within the first end of the universal adapter and a set screw at the second end of the universal adapter.

3. The fluid delivery system of claim 1, further including a protective material formed on the faucet body.

4. The fluid delivery system of claim 3, wherein the protective material is configured as an animal decoration or figurine.

5. The fluid delivery system of claim 3, wherein the protective material is bonded to the faucet body and the elbow spout.

6. The fluid delivery system of claim 1, further including a set screw adjacent the second end of the universal adapter.

7. The fluid delivery system of claim 1, further including:
a first O-ring configured for mating with a first portion of the universal adapter;
a second O-ring configured for mating with a second portion of the universal adapter;
a third O-ring configured for mating with the elbow spout; and
a fourth O-ring configured for mating with the diverter.

8. A fluid delivery system, comprising:
a faucet body having a first end, a second end, and a channel that extends from the first end of the faucet body to the second end of the faucet body, wherein the faucet body has an exterior surface and an interior surface, and the channel has a first threaded portion at the first end and a second threaded portion at the second end;
a bushing having a first end and a second end, the bushing configured to be coupled to a universal adapter;
the universal adapter comprising a threaded body having a first end, a second end, and a duct, the first end and the second end on opposite ends of the threaded body, wherein the threaded body has an exterior wall and an interior wall, the interior wall bounding the duct, and wherein the universal adapter is configured to mate with the faucet body, wherein the universal adapter has:
a first threaded portion formed in a first portion of the exterior wall;
a first groove formed in a second portion of the exterior wall, the first groove adjacent the first threaded portion;
a second threaded portion formed in a first portion of the interior wall; and
a second groove formed in a second portion of the interior wall; and wherein the bushing has a threaded exterior wall, the threaded exterior wall of the bushing configured to mate with the second threaded portion of the universal adapter and the first threaded portion formed in the first portion of the exterior wall configured to be screwed into the first threaded portion of the channel of the faucet body without the occurrence of fluid leakage, and wherein, the universal adapter is configurable for mating with pipes having different diameters without fluid leakage;
an elbow spout having a first end and a second end, wherein the elbow spout has a coupling structure extending from the first end, the coupling structure having a threaded portion and a third groove, the threaded portion of the coupling structure screwed into the second threaded portion of the channel of the faucet body; and
a diverter having a body portion having a first end and a second end, the diverter configured to be coupled to the elbow spout and comprising:
a channeling structure extending from the first end; and
a fluid pressure adjustment structure adjacent the channeling structure.

9. The fluid delivery system of claim 8, further including a first O-ring positioned in the first groove, a second O-ring positioned in the second groove, and a third O-ring positioned in the third groove.

10. The fluid delivery system of claim 8, further including a locking feature formed on the exterior surface of the faucet body.

11. The fluid delivery system of claim 10, wherein the locking feature comprises at least one flange.

12. The fluid delivery system of claim 11, wherein the at least one flange has an opening extending therethrough.

13. The fluid delivery system of claim 11, wherein the at least one flange has a body portion extending in a direction of the channel of the faucet body.

14. A fluid transport system, comprising:
a faucet body having a first end connected to a second end by a channel;
a universal adapter coupled to the faucet body at the first end, the universal adapter having a first inlet/outlet port and a second inlet/outlet port and configured so that the first inlet/outlet port and the second inlet/outlet port can be sealingly mated to the faucet body at the first end, the universal adapter configurable for coupling with threaded pipes at the first inlet/outlet port or coupling with and being secured to unthreaded pipes at the second inlet/outlet port, and wherein the universal adapter is configurable for sealingly mating with pipes having different diameters;

an elbow spout having an inlet port and an outlet port, the inlet port coupled at the second end of the faucet body; and a diverter having a body portion, a fluid inlet portion, fluid outlet portion, a coupling structure, and a pressure actuated position holding structure, the body portion positioned between the fluid inlet portion, and the fluid outlet portion, the diverter configured to be positioned in the second end of the elbow spout.

15. The fluid transport system of claim 14, further including:
a first O-ring coupled between the faucet body and the universal adapter;
a second O-ring coupled between the faucet body and the elbow spout; and
a third O-ring coupled between the elbow spout and the diverter.

16. The fluid transport system of claim 14, further including a protective material bonded to the faucet body to form a unitary faucet body.

17. The fluid delivery system of claim 14, further including a set screw adjacent the second inlet/outlet port.

18. A fluid transport system, comprising:
a faucet body having a first end connected to a second end by a channel;
a universal adapter coupled to the faucet body at the first end, the universal adapter having a first inlet/outlet port and a second inlet/outlet port and configured so that the first inlet/outlet port and the second inlet/outlet port can be sealingly mated to the faucet body at the first end, wherein the universal adapter comprises:
a threaded body having a first end, a second end, and a channel, the first end and the second end on opposite ends of the threaded body, and wherein the threaded body has an exterior wall and an interior wall, the interior wall bounding the channel;
a first threaded portion formed in a first portion of the exterior wall;
a first groove formed in a second portion of the exterior wall, the first groove adjacent the first threaded portion;
a second threaded portion formed in a first portion of the interior wall adjacent the first end of the threaded body;
a second groove formed in a second portion of the interior wall; and wherein the first inlet/outlet port is at the first end of the threaded body and the second inlet/outlet port is at the second end of the threaded body;
an elbow spout having an inlet port and an outlet port, the inlet port coupled at the second end of the faucet body; and
a diverter having a fluid pressure adjustment structure, the diverter configured to be coupled at the outlet port of the elbow spout.

19. The fluid transport system of claim 18, further including a bushing screwed into the second threaded portion of the universal adapter, the second threaded portion of the universal adapter inserted into the first end of the faucet body and the universal adapter screwed into the first end of the faucet body.

20. The fluid transport system of claim 19, further including a pipe inserted into the second end of the threaded body and secured by a set screw.

21. The fluid transport system of claim 19, further including a pipe inserted into the first end of the threaded body, the pipe having a male thread screwed into the second threaded portion of the universal adapter.

22. The fluid transport system of claim 18, wherein
the fluid pressure adjustment structure is configured to maintain a position of the elongated hollow body.

23. A method for manufacturing a faucet, comprising:
providing a faucet body having a first end connected to a second end by a channel, a universal adapter coupled to the faucet body at the first end, the universal adapter having a first inlet/outlet port and a second inlet/outlet port and configured so that the first inlet/outlet port and the second inlet/outlet port can be sealingly mated to the faucet body at the first end, the universal adapter configurable for coupling with threaded pipes at the first inlet/outlet port or coupling with and being secured to unthreaded pipes at the second inlet/outlet port, and wherein the universal adapter is configurable for sealingly mating with pipes having different diameters, an elbow spout having an inlet port and an outlet port, the inlet port coupled at the second end of the faucet body; and a diverter having a pressure actuated position holding structure, the diverter coupled at the outlet port of the elbow spout, wherein the diverter includes a cavity configured for reducing water pressure within the cavity; and
bonding a protective material to the faucet so that the faucet and the protective material form a unitary structure.

24. The method of claim 23, wherein bonding the protective material to the faucet includes bonding a polymeric material to the faucet.

25. The method of claim 24, wherein bonding the protective material to the faucet includes forming the protective material in a shape selected from a group of shapes comprising a whale, a firetruck, and a dog.

26. The method of claim 23, further including coupling the universal adapter with the threaded pipes with a bushing or coupling the universal adapter with the unthreaded pipes with a set screw.

* * * * *